May 21, 1935.　　　　P. H. CRAIG　　　　2,001,836

POWER CONTROL CIRCUITS

Filed Nov. 27, 1931　　　3 Sheets-Sheet 1

Inventor

PALMER H. CRAIG

By Ralph B. Stewart

Attorney

May 21, 1935. P. H. CRAIG 2,001,836
POWER CONTROL CIRCUITS
Filed Nov. 27, 1931 3 Sheets-Sheet 2

Inventor
PALMER H. CRAIG
By Ralph B. Stewart
Attorney

May 21, 1935.　　　　　P. H. CRAIG　　　　　2,001,836
POWER CONTROL CIRCUITS
Filed Nov. 27, 1931　　　3 Sheets-Sheet 3
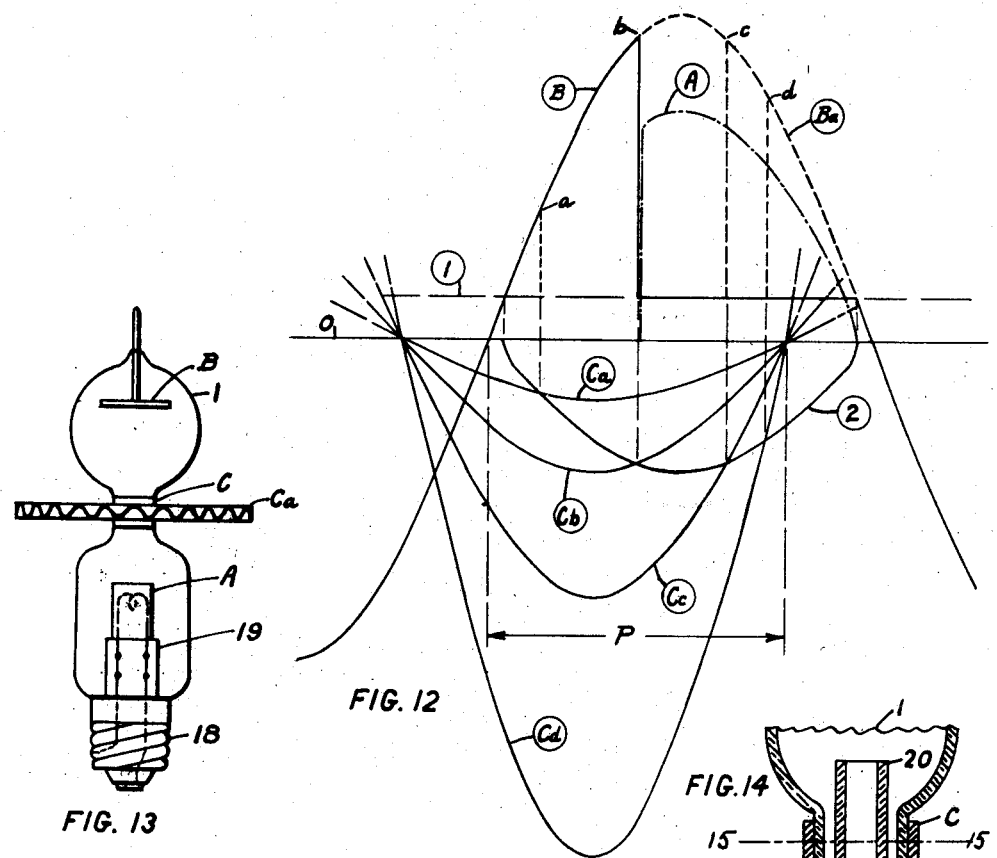
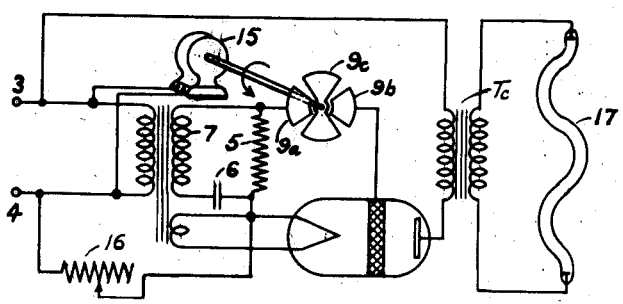
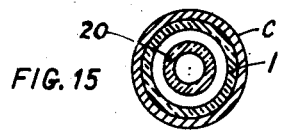
Inventor
PALMER H. CRAIG
By Ralph B. Stewart
Attorney Patented May 21, 1935

2,001,836

UNITED STATES PATENT OFFICE 2,001,836

POWER CONTROL CIRCUITS

Palmer H. Craig, Cincinnati, Ohio, assignor to Invex Corporation, a corporation of New York Application November 27, 1931, Serial No. 577,691

27 Claims. (Cl. 250—27)

My invention relates to an electric relay and circuits therefor for the control of power currents.

An object of my invention is to devise relay circuits for the control of relatively large currents and power such as is required in commercial uses of electricity supplied over power lines and lighting systems. More specifically, an object of my invention is to devise a relay circuit for the control of relatively large currents in response to voltage variations applied to the relay circuit.

A further object is to devise a relay circuit employing a vapor electric relay wherein the anode current is controlled in accordance with the magnitude of the voltage applied to the control electrode, and in which the power consumed by the controlling circuit is substantially nil.

Still another object is to devise a voltage operated relay circuit for the control of relatively large currents by simple means and without the use of movable or sliding contacts or switches.

Heretofore vapor electric relays comprising an electron emitting cathode, an anode, and a grid or control electrode, have been employed for the control of relatively large currents. In one type of construction of such prior devices the grid or control electrode is in the form of a screen located within the tube envelope which encloses the cathode and the anode, and separates these two elements. This type of tube is commonly known as a thyratron. In another type the control electrode is located outside of the envelope in a plane lying between the anode and the cathode. A characteristic of both types of tubes is that by impressing a suitable potential upon the control electrode the starting of the arc may be prevented or allowed, as desired, but once the arc between the anode and the cathode is established, the control electrode is no longer effective, and the arc can only be stopped by interrupting the anode current. It has heretofore been proposed to include the anode-cathode path of such a vapor electric device in a power circuit supplied with alternating current, supply to the control electrode circuit an alternating current voltage of the same frequency as the power current, and to vary the phase of the control voltage in order to vary the time of striking of the arc during each positive pulsation of the anode voltage. In this manner the effective value of the current in the power circuit may be controlled.

I have discovered that by suitable circuit arrangements, vapor electric relays of the type referred to above may be employed for the control of relatively large currents by impressing upon the control electrode circuit electric potentials of varying magnitude. My invention, therefore, is distinguished from prior systems in that the control of the vapor electric relay is by variations in magnitude of a voltage of fixed phase applied to the control electrode circuit, whereas in the prior art arrangements a voltage of constant magnitude but of variable phase is applied to the control electrode circuit.

The control circuits which I have devised may be employed in any alternating current system wherein it is desired to vary the current or power supplied to a circuit. For example, the control circuits may be employed in theater light dimming systems; for starting electric motors; for varying the current supplied to electric signs; for use in telemetric systems for indicating at one point a variable quantity occurring at another point; and for use as a modulator, an amplifier, a frequency changer, and many other uses which will be obvious to one skilled in the art. The circuits are not limited in use to low frequency systems, but may be used for the control of currents of high frequency, as will appear hereinafter.

Various forms of my invention are illustrated in the accompanying drawings in which:

Figure 11 is a circuit diagram illustrating the application of the circuit of Figure 3 to a neon sign flashing system;

Figure 12 shows current and voltage curves obtained in the operation of my control circuits;

Figure 13 illustrates a form of vapor electric tube employed in the control circuits;

Figure 14 is an enlarged fragmentary sectional view of another tube construction; and Figure 15 is a sectional view of Figure 14 along line 15—15.

Figure 1:
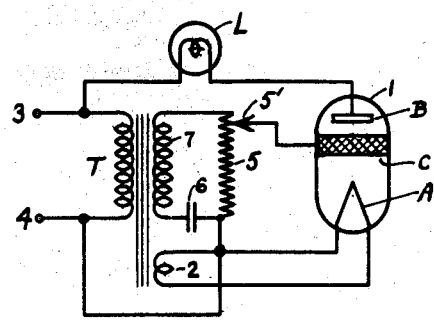
Figure 1 is a circuit diagram illustrating one form of my control circuit.

Referring to Figure 1, a mercury vapor tube is schematically indicated at 1, having an electron emitting cathode A, an anode B, and a control electrode C. This tube may be of well known construction, and I have obtained good results by employing a type 866 hot cathode, mercury vapor rectifier, with a control electrode or screen placed around the outside of the bulb. I have found that good operation may be obtained by using a control electrode consisting of a single turn of wire surrounding the tube, but the voltage required for obtaining good control is lowered by increasing the area of the control electrode. While a tube of the thyratron type may be employed, I prefer to use a tube with an external control electrode in order to reduce the current and power consumed by this electrode. The cathode of the tube is energized by a low voltage winding 2 of a transformer T, the primary of which is connected to terminals 3 and 4 of a source of alternating current. A high resistance 5 and a condenser 6 are connected in series across the terminals of secondary winding 7 of transformer T. One end of resistance 5 is connected to the cathode circuit, and the variable contact 5′ associated with resistance 5 is connected to the control electrode C. The cathode circuit is also connected to terminal 4 of the power source, and the anode B is connected to the other terminal of the power source through any suitable load represented by the lamp L.

Operation of Figure 1 is as follows: Current from the source of alternating current flows through the load L during each pulsation in which the anode B is positive with respect to the cathode A, as is well understood. Resistance 5 is connected to secondary winding 7 in a manner such that the polarity of the control electrode C is negative when anode B is positive with respect to cathode A. By suitably choosing the fixed values of resistance 5 and condenser 6, the effective value of the current flowing through the load L may be varied by shifting contact 5′ along resistance 5; moving the contact down towards the cathode terminal of the resistance increases the current, and moving the contact towards the upper end of resistance 5 decreases the current.

The conditions necessary for the operation of the control circuit may be seen from Figure 12. In this figure I have represented the relations between the voltage waves applied to the anode and to the control electrode of the tube. The zero axis is indicated by the line O. The curve (B) indicates the voltage wave applied to the anode B. The curves (Ca), (Cb), (Cc) and (Cd) represent voltage waves of different magnitudes applied to the control electrode C. The distance P represents the phase displacement between the anode voltage curve and the voltage curves for the control electrode. The curve (A) represents a current pulse flowing in the anode circuit under a given condition of operation. The dashed line (I) indicates a limited voltage below which the arc will not be sustained. The curve (2) indicates the negative voltage necessary to be applied to the control electrode in order to prevent the starting of the arc at different portions of the positive alternation of the anode voltage. This curve has a shape of approximate sinusoidal form, due to the wave form of the anode voltage; as the anode voltage increases in value, the negative voltage required to be impressed upon the control electrode must be greater, and vice versa, as the anode voltage decreases in value, the negative voltage required to just prevent the starting of the arc is of less value. If the voltage applied to the control electrode C were 180° out of phase with the anode voltage, it will be seen that as the magnitude of this control voltage is increased from a small value to a point where the maximum instantaneous value is equal to the maximum ordinate of curve (2), the curve representing the control voltage will substantially coincide with the curve (2), and the arc will be prevented from starting throughout the length or duration of the positive alternation of the anode voltage. By reducing the control voltage applied to the screen, the arc is permitted to start at a point early in the positive alternation of the anode voltage. It will thus be seen that where the control voltage is 180° out of phase with respect to the anode voltage, only a very slight change in value of the control voltage is necessary to completely cut off the anode current or to allow full anode current to flow. Such type of control I term "on-and-off" control. In order to obtain a control which varies the anode current continuously and progressively in accordance with the magnitude of the voltage applied to the control electrode C, I apply to the control electrode a voltage which is displaced in phase less than 180° with respect to the anode voltage wave, and for this purpose condenser 6 is inserted in series with resistance 5. In Figure 12 I have shown the control voltage wave lagging behind the anode voltage wave by approximately 135°. The curve (Ca) represents a control voltage wave of small amplitude, and this curve crosses curve (2) at a point opposite point a on the anode voltage curve (B). Beyond this point, the control voltage is not of sufficient magnitude to prevent the starting of the arc, so the arc will start at a point slightly beyond the point a on the anode voltage curve. If the control voltage be increased in value corresponding to curve (Cb), the arc will be delayed in starting until the point b on the anode voltage curve is reached.

The anode voltage curve (B) and the anode current curve (A) in Figure 12 illustrate the operation obtained with a control voltage wave represented by curve (Cb). It will be seen that curve (B) is drawn in solid lines to point b, then vertically downward to the horizontal line (I) then horizontally to the right until it reaches the extended envelope of its sine wave form. The curve (A), representing the current pulse flowing in the anode circuit rises abruptly from zero to a value near its peak value immediately following the point b, and then continues in a sinusoidal form until the arc is extinguished at the end of the alternation. At the instant of starting of the arc, the anode voltage abruptly drops to a constant value represented by dashed line (I) of the order of 15 to 20 volts, and it remains at this value throughout the remaining part of the alternation. The dotted portion (Ba) of curve (B) represents the sinusoidal outline which the anode voltage wave would assume in case no current flows through the anode circuit.

By increasing the control voltage to a value represented by curve (Cc), the starting of the arc will be delayed until the point c on the curve (B) is reached, and in the same manner, by further increasing the control voltage to a value represented by curve (Cd), starting of the arc is further delayed until the point d on curve (B) is reached. It will be seen that the time at which the arc starts in the positive pulsation may be controlled by varying the magnitude of the control voltage, keeping the phase of this voltage fixed. Since the effective value of the anode current is dependent not only upon the maximum instantaneous value but also upon the duration of each pulse, it will be seen that the effective value of the load current may be controlled by varying the magnitude of the control voltage.

Using a lamp load at L, and a type 866 rectifier tube with an external grid, I have obtained good dimmer control with the circuit arrangement shown in Figure 1, employing a resistance 5 of the order of 100,000 ohms and a condenser 6 having a capacity of the order of 0.02 to 0.03 micro-farads; the secondary winding 7 delivering a terminal voltage of the order of 600 volts, with an impressed primary voltage of 120 volts at 60 cycles. Good operation is obtained with the control electrode consisting of a single turn of wire surrounding the tube, but a screen or band electrode of larger area is more effective. Since the control electrode C is located outside of the tube, the current drawn by this electrode is substantially nil. The circuit constants given above are for illustration only; it being obvious that the values in any particular circuit will depend upon the characteristics of the tube and other circuit constants and requirements. The important point is the amount of fixed phase displacement between the anode voltage and the control voltage. For best results this must be substantially less than 180°, otherwise substantially nothing but "on-and-off" control will be obtained, and it should be greater than 90° in order to extend the control into the latter half of the positive alternation of the anode voltage.

It will be clear that dimmer control in varying degrees may be obtained using phase displacements of the control voltage over a range of 90 to 180 degrees, but the degree of dimmer control decreases as the displacement approaches 180 degrees.

Figure 2:
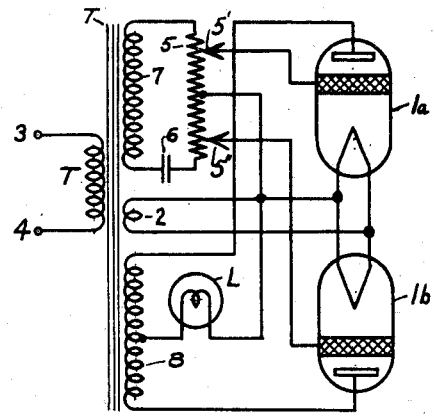
Figure 2 is a modification of Figure 1 for full-wave control.

The circuit shown in Figure 1 permits current to flow through the load L during the positive alternations only. In Figure 2 I have shown an extension of the circuit of Figure 1 wherein current is supplied to the load L during both the positive and the negative alternations of the supply current. Corresponding elements are indicated by like reference numerals in the two figures. In this arrangement, the transformer T is provided with an additional secondary winding 8 the terminals of which are connected, respectively, to the anode elements of tubes 1a and 1b, and the load L is connected between a center tap on winding 8 and the cathode heating circuit. The midpoint of resistance 5 is connected to the cathode heating circuit and the variable contacts 5' and 5'' are connected respectively to the control electrodes of tubes 1a and 1b. It is obvious that during one alternation of the supply current tube 1a will permit current to flow through the load L, while during the other alternation, tube 1b will permit current to flow. By arranging variable contacts 5' and 5'' to be moved simultaneously to increase or decrease the voltage applied to their respective grids, the effective value of the current flowing through the load may be controlled.

Figure 3:
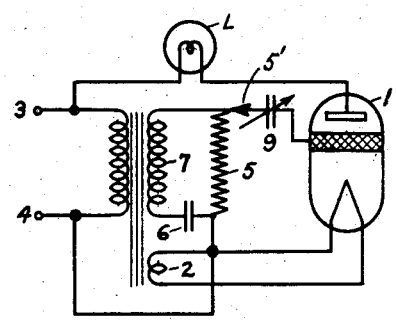
Figures 3, 4 and 5 are circuit diagrams of three other arrangements of my control circuit.

In Figure 3 I have shown a modified form of my control circuit. This circuit corresponds substantially to that shown in Figure 1 except that a variable condenser 9 of small capacity is inserted in the connection between the resistance 5 and the control electrode. Using apparatus with the circuit constants as given above, I find that a variable condenser 9 having a maximum capacity of the order of 15 micro-micro-farads produces good continuous progressive variation of the anode current by varying the condenser. Leaving contact 5' fixed at a high voltage point, increasing the capacity of condenser 9 decreases the anode current, and vice versa, decreasing the capacity of condenser 9 increases the anode current. It is possible by varying condenser 9 alone to vary the anode current from maximum value to a low value where the lamp L does not glow. If desired, the anode current may also be controlled by shifting contact 5', but with a proper setting of this contact, full control may be obtained by condenser 9.

Figure 4:
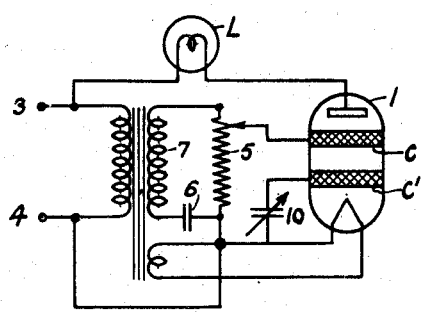

Another form of control circuit is illustrated in Figure 4 wherein the circuit arrangement is substantially like that shown in Figure 1 with the addition, however, of an extra control electrode C' and a variable condenser 10 connecting this control electrode to the cathode circuit. With a high negative voltage impressed upon electrode C, varying condenser 10 will cause a variation in the anode current flowing through the load L. In this case, however, increasing the capacity of the variable condenser increases the anode current, and decreasing the capacity results in a decrease in the anode current. The two control electrodes C and C' may be formed each of a single turn of wire placed about the tube, and spaced apart a distance of the order of an inch, or they may be formed as band electrodes if desired. The relative positions of these two control electrodes may be reversed from that shown in the drawings. While the exact nature of the operation of this circuit is not entirely clear, it is obvious that the presence of the second control electrode C' and its associated connection exerts a modifying action upon the action of the control electrode C.

Figure 5:
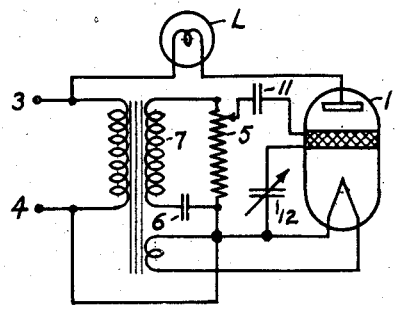

In Figure 5 I have shown another control circuit which embodies control features disclosed in Figures 3 and 4. In this circuit, tube 1 is provided with a single control electrode connected to a high potential point on resistance 5 through a condenser 11 of small capacity, and also connected to the cathode circuit through a variable condenser 12 of small capacity. Condenser 11 may have a capacity of the order of 15 micro-micro-farads and the maximum capacity of condenser 12 may be of the same order of magnitude.

In each of Figures 1, 3, 4, and 5, and in all circuits based upon these figures, the condenser 6 may be inserted in the connection between the upper terminal of winding 7 and resistance 5, instead of in the position shown; or the capacity reactance represented by this condenser may be divided between two condensers, one in the position shown, and the other in the position referred to above. In Figures 4 and 5, variable condensers 10 and 12 may be replaced by variable resistances of high resistance values, for example, resistances of the order of 250,000 ohms and higher. Also, in Figure 4 a condenser of small capacity may be inserted in the connection to electrode C in the same manner as condenser 11 in Figure 5. Other obvious variations in these circuit arrangements will be apparent to one skilled in the art.

Figure 6:
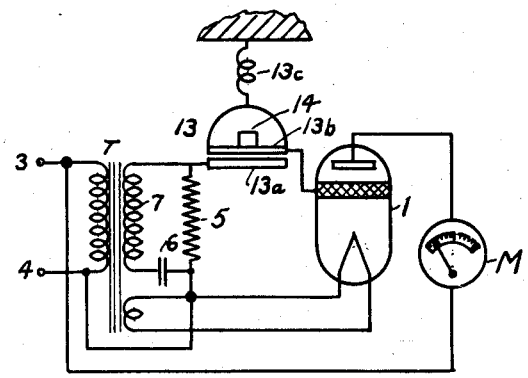
Figure 6 is a circuit diagram illustrating the application of the circuit of Figure 3 to a system for weighing objects.

In Figure 6, I have shown the circuit of Figure 3 applied to a system for indicating the weight of objects. In this arrangement, the variable condenser 9 shown in Figure 3 takes the form of a capacity scale 13 comprising a fixed plate 13a and a movable plate 13b suspended above the fixed plate by a spring 13c from a suitable support. The object 14 to be weighed is placed upon movable plate 13, and depresses this plate to a greater or less extent towards plate 13a, and thereby changes the value of its capacity in accordance with the weight of the object. An electric meter M is inserted in the anode circuit with tube 1, and the scale of this meter may be graduated to indicate weight in pounds or any other desirable unit. The meter M may be located at a point remote from the weighing scale 13. The movable plate 13b may be arranged below the fixed plate 13a, and the calibration of the meter M changed accordingly.

Any of the circuits shown in Figures 3 to 5 may be employed for the purpose of detecting the passage of persons or objects along a passageway by forming the variable condenser of plates of suitable size arranged on opposite sides of the passageway. The passage of a person or an object, such as an automobile, between the fixed plates will vary the capacity of the condenser and cause the anode current to vary correspondingly. The variation in anode current may be utilized through well known means for indicating or recording the number of passages taking place, or for indicating the presence of an object at a certain point in the passageway. The indicating device may be located at a point remote from the control tube.

Figure 7:
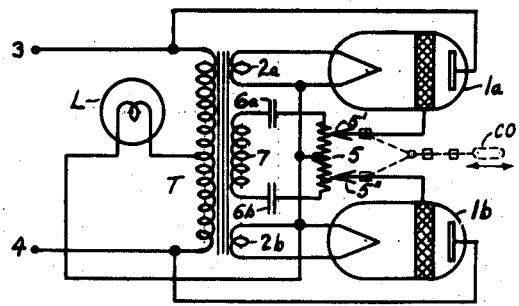
Figure 7 is a circuit diagram of a second form of full-wave control circuit.

In Figure 7 I have shown a full-wave control circuit suitable for use upon 240 volt mains where the load requires only 120 volts. In this arrangement load L is connected between a midpoint tap on the primary of transformer T and the cathode circuits of tubes 1a and 1b; the anodes of the tubes being connected to the terminals 3 and 4 of the source of alternating current. The midpoint of resistance 5 is connected to the connection joining the two cathode circuits, and variable contacts 5' and 5'' are connected, respectively, to the control electrodes of the tubes. The capacity element connected in series with the resistance 5 and winding 7 is shown divided between two condensers 6a and 6b, as suggested above, but only one condenser may be used if desired. The operation of Figure 7 is believed to be obvious; one tube permits the passage of current through the load L during one alternation, while the other permits current to pass during the other alternation, and the voltage impressed upon the load is approximately one-half the line voltage.

Figure 8:
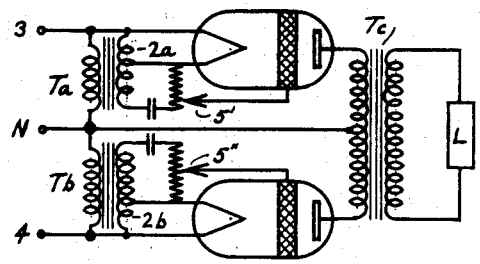
Figure 8 is a circuit diagram of a full-wave control circuit supplied from a three-wire power system.

In Figure 8 I have shown another full-wave control circuit adapted for use on an ordinary three-wire lighting circuit having outside conductors 3 and 4 and a neutral conductor N. In this arrangement tubes 1a and 1b are connected between conductors 3 and 4 and the terminals of output transformer Tc. The neutral conductor N is connected to a midpoint tap on the primary of transformer Tc. Each of the tubes is provided with a separate transformer for energizing the filament and for supplying a control voltage to the control electrodes. The manner of operation of this circuit is obvious.

Figure 9:
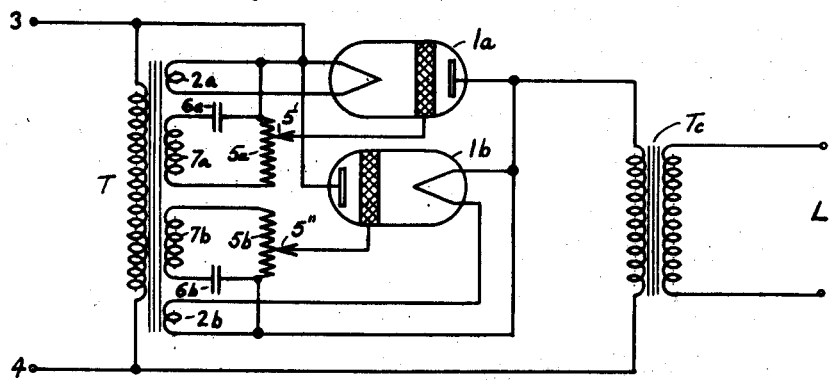
Figure 9 is a fourth form of full-wave control system having an alternating current load circuit.

In Figure 9 I have disclosed another form of full-wave control circuit wherein tubes 1a and 1b are connected in parallel with each other, but in reverse directions, in series with the primary of output transformer Tc. Transformer T is provided with windings 2a and 2b for heating the cathodes of tubes 1a and 1b, respectively, and separate windings 7a and 7b are provided for supplying control voltages to the grids of the two tubes. Tube 1a permits the passage of current when conductor 4 is positive with respect to conductor 3, and tube 1b permits passage of current when the polarity is reversed.

It will be noted that in the full-wave arrangements shown in Figures 2 and 7, rectified alternating current is supplied to the load, while in Figures 8 and 9, pure alternating current is supplied to the load. As indicated above in connection with Figure 2, in each of the full-wave circuits common control means symbolized at CO in Figure 7 may be provided for shifting variable contacts 5' and 5'' simultaneously to increase or decrease the current flowing through their respective tubes.

Figure 10:
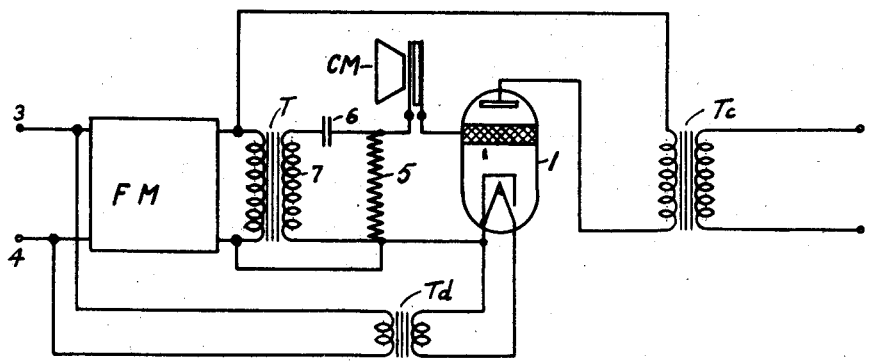
Figure 10 is a circuit diagram illustrating the application of the circuit of Figure 3 to a telephone amplifying or modulating system.

In Figure 10 I have shown the circuit arrangement of Figure 3 adapted as a telephone amplifier or modulator. In this arrangement, 3 and 4 indicate the terminals of a low frequency source of alternating current, FM indicates a frequency multiplier interposed between the alternating current source and the primary of transformer T, for changing the frequency of the current supplied to the tube 1 to a super-audible frequency. Suitable frequency multipliers are well known, and the number of multiplying stages employed will depend upon the multiplication desired. A low frequency transformer TD is provided for heating the cathode of the tube, although if desired, the cathode may be heated by the super-audible frequency current. The condenser 9 of Figure 3 takes the form of a condenser microphone schematically indicated at CM. Upon speaking into the mouthpiece of the condenser microphone, the capacity of the microphone is varied in accordance with the sound waves impinging upon the movable plate. The variation in capacity causes the anode current to vary correspondingly, and a super-audible current of variable magnitude is supplied to the output transformer Tc, from which it may be transmitted to any desired point and there rectified and detected. Since tube 1 itself acts as a rectifier, the transformer Tc may be replaced by a suitable loud speaker or sound reproducing apparatus. The circuit leading to such apparatus may be extended to any desired point. The circuit arrangement shown in Figure 10 may be modified to produce full-wave operation in accordance with circuit arrangements illustrated in Figures 2, 7, 8 and 9, it being understood that a double condenser microphone will be employed, one section being connected in each control electrode circuit. Instead of using a low frequency source of power and a frequency changer, the circuit of Figure 10 may be energized from any suitable source of ultra-audible frequency current, such as well known oscillation generators. The circuit arrangements shown in Figures 4 and 5 may be adapted for use as a telephone amplifier or modulator by supplying the anode circuit with super-audible frequency as in Figure 10, and by replacing variable condensers 10 and 12 with condenser microphones.

In Figure 11 I have shown the circuit of Figure 3 adapted to a system for varying the current supplied to a neon sign. In this arrangement the condenser 9 of Figure 3 takes the form of a condenser having two stationary plates 9a and 9b connected, respectively, to resistance 5 and to the control electrode of the tube, and a rotary sector plate 9c, which is continuously rotated by a motor 15 supplied from mains 3 and 4. 16 is a variable regulating resistance inserted in the circuit of tube 1 to control the normal operating current of the system. A neon tube sign represented at 17 is connected to the secondary of transformer Tc. Rotation of condenser plate 9c causes the anode current through the tube to periodically increase and decrease in such manner that the neon sign 17 appears to pulse. The sign 17 may be completely extinguished without reducing the anode current to zero, since a minimum operating voltage is required to sustain the discharge in the sign 17.

In Figure 13 I have shown the details of construction of a specific form of vapor electric tube to be employed in the control circuits described above. This tube comprises a glass envelope 1 provided with an ordinary screw plug 18 and having a reentrant press stem 19 on which is supported a uni-potential cathode A, the heater winding of which is connected to the sleeve and tip of the plug 18. A section of the envelope 1 lying between the cathode A and the anode B is drawn down to form a constricted neck, and a control electrode in the form of a band C is placed around this constricted neck portion. I have discovered that better control action is obtained by placing the control electrode around a constricted portion of the tube as shown in this arrangement. I have also discovered that better operation is obtained when the walls of the tube are prevented from attaining a high temperature, and in order to dissipate the heat concentrated at the constricted neck portion, the control electrode C may be provided with a radiating fin element Ca.

In Figures 14 and 15 I have illustrated another arrangement for preventing the constricted neck from becoming too hot. Figure 14 is a fragmentary enlarged view showing the constricted section of the tube in cross-section. In this arrangement a tube 20 formed of quartz or other refractory material is supported within the constricted neck portion by a rod 21 which is supported by the press stem 19 (not shown). The tube 20 is concentric with and spaced apart from the inner wall surface of the envelope 1, as shown in Figure 15, and serves to protect the wall of tube 1 from the heat of the arc at the restricted neck portion.

It will be obvious to one skilled in the art that various modifications in the specific circuit arrangements which I have shown and described may be made without departing from the spirit of my invention. A few of such modifications will be mentioned.

In Figures 1, 3, 4, and 5, and in any circuit derived from these circuits wherein the condenser 6 is connected directly between the transformer winding 7 and the cathode circuit, this condenser may be omitted entirely in case there is sufficient capacity existing between the winding 7 and the cathode winding 2 of the transformer to produce the required phase displacement of the control voltage. In this case the lower terminal of winding 7 will remain free and disconnected, and the value of resistance 5 will depend upon the value of the capacity existing between the two transformer windings. Also, the anode or load circuits in these figures may be supplied from a separate secondary winding of transformer T instead of the direct connection to the primary circuit as shown. It is also obvious that separate transformers may be provided for supplying the cathode, anode and control electrode circuits, respectively, or any two of these circuits may be supplied from a single transformer provided with two secondary windings, and the third circuit supplied from a second transformer.

In the full wave arrangements shown in Figures 2 and 7, the tubes 1a and 1b may take the form of a single tube having an elongated envelope with a single cathode located at the middle of the tube, the two anodes located in the ends of the envelope, and the two grids arranged outside of the envelope between the cathode and their respective anodes.

Figure 4 may be modified by omitting variable condenser 10 and connecting the second grid C' to a source of variable voltage, for example, a direct connection from the grid to a variable tap on resistance 5 may be provided, or the second grid may be connected to any source of variable voltage such as a low frequency microphone circuit. In the latter case, the anode circuit must be supplied with ultra-audible frequency in order for the circuit to be employed as a telephone amplifier or modulator.

The arrangement shown in Figure 11 may be extended to control a plurality of separate circuits by providing several pairs of stator plates, one plate of each pair being connected to the control circuit of the transformer, while the other plates of the pairs are connected to the separate tubes controlling the various circuits, a single rotor plate being employed in association with the plurality of pairs of stator plates. The neon lights controlled by the separate circuits may form separate signs, or they may constitute different sections in a single sign. It is obvious that instead of employing separate tubes in this arrangement, a single tube having a single cathode with a plurality of anodes arranged in separate arms or extensions of the tubes may be employed, each arm being provided with a control electrode connected to a stator plate.

The circuit arrangement shown in Figure 6 may be employed for the purpose of measuring unknown capacities, by suitably calibrating meter M in terms of capacity by inserting in the control electrode circuit standard condensers of known values in the place of the capacity scale 13. The unknown capacity is then substituted for the standard condenser, and the meter reading indicates directly the value of the unknown capacity. The circuit arrangement shown in Figure 4 may also be employed for this purpose. In this connection it may be noted that the circuit arrangements shown in Figures 3 and 4 may be employed for detecting changes in characteristics of various materials in manufacturing processes by passing the material between the condenser plates, and the resulting changes in capacity of the condenser are reflected in the output circuit. For example, the presence of small metal particles or foreign substances in chewing gum and candy may be detected by passing the gum or candy between the condenser plates in a thin layer and noting the changes in anode current. These circuits may also be employed for detecting breaks in the manufacture of paper by passing the paper between the condenser plates, and the change in the dielectric constant of the condenser produced by a break in the paper will produce a change in the anode current sufficient to operate a suitable signal.

The circuit of Fig. 4 is being claimed in my copending application Serial No. 646,662, filed Dec. 10, 1932, which is in part a continuation of this application. My copending application Serial No. 688,249, filed September 5, 1933, contains claims covering broadly control circuits employing an alternating control voltage of fixed phase and variable amplitude applied to an external or insulated grid. My copending application Ser. No. 8741, filed February 28, 1935, contains claims on subject matter disclosed in this application relating to circuits for detecting the presence of extraneous objects.

My invention may be embodied in other circuit arrangements and modifications of those disclosed herein, and may be applied to various other uses. Accordingly, the scope of my protection is to be limited only by the annexed claims.

What I claim is:

1. An electric control system comprising a vapor electric device having a cathode an anode and a control electrode, an alternating current circuit including the space current path of said device, means for impressing upon said control electrode an alternating voltage displaced in phase by a constant substantial angle substantially less than 180° with respect to the anode voltage for delaying the starting of the arc in said device, and means for varying the amplitude of said alternating control voltage to vary the amount of delay.

2. An electric control system comprising a vapor electric device having a cathode an anode and a control electrode, an alternating current circuit including the space current path of said device, means for impressing upon said control electrode an alternating voltage lagging in phase by a constant substantial angle substantially less than 180° with respect to the voltage of said anode for delaying the starting of the arc in said device, and means for varying the amplitude of said alternating control voltage to vary the amount of delay.

3. An electric control system comprising a vapor electric device having a cathode an anode and a control electrode, an alternating current circuit including the space current path of said device, means for impressing upon said control electrode an alternating voltage having a lagging phase displacement with respect to the voltage of said anode greater than 90° and substantially less than 180°, and means for varying the amplitude of said alternating control voltage.

4. An electric control system comprising a vapor electric device having a cathode an anode and a control electrode, an alternating current circuit including the space current path of said device, means for impressing upon said control electrode an alternating voltage having a lagging phase displacement with respect to said anode voltage of the order of 135°, and means for varying the amplitude of said alternating control voltage.

5. An electric control system comprising a pair of vapor electric devices having a cathode an anode and a control electrode, an alternating current circuit including the space current paths of said devices connected in reverse directions, means for impressing upon the control electrode of each device an alternating voltage having a lagging phase displacement with respect to its anode voltage of the order of 135°, and common means for varying the amplitudes of said control voltages in the same direction.

6. An electric control circuit comprising a pair of vapor electric devices having a cathode an anode and a control electrode, a source of alternating current, a work circuit, circuit connections between said source and said work circuit including the space current paths of said devices connected in opposite directions, means for impressing upon the control electrode of each device an alternating voltage lagging in phase substantially less than 180° with respect to its anode voltage, and common means for varying the amplitudes of said control voltages.

7. In an electric control system, the combination of a source of alternating current, a vapor electric device having a cathode an anode and a control electrode, a work circuit including said source and the space current path of said device, a second circuit of fixed constants connected to include said source independently of said device and including a condenser and a fixed resistance element connected in series, and a control circuit for said device connected between the cathode and the control electrode including a variable tap on said resistance for impressing upon said control electrode a variable alternating potential derived from across said resistance.

8. In an electric control system, the combination of a source of alternating current, a vapor electric device having a cathode an anode and a control electrode, a work circuit including said source and the space current path of said device, a second circuit of fixed constants connected to include said source independently of said device and including a condenser and a resistance element connected in series, a control circuit for said device connected between the cathode and the control electrode including at least a portion of said resistance, and a variable condenser inserted in the connection between said resistance and said control electrode.

9. In an electric control system, the combination of a source of alternating current, a vapor electric device having a cathode an anode and a control electrode, a work circuit including said source and the space current path of said device, a second circuit of fixed constants connected to include said source independently of said device and including a condenser and a resistance element connected in series, a control circuit for said device connected between the cathode and the control electrode including a portion of said resistance, a variable condenser inserted in the connection between said resistance and said control electrode, and means for continuously rotating said variable condenser.

10. An electric control system comprising a vapor electric device having a cathode an anode and a control electrode, an alternating current circuit including the space current path of said device, means for impressing upon said control electrode an alternating voltage having a lagging phase displacement with respect to said anode voltage of the order of 135°, and a variable impedance element in an alternating current circuit associated with said device for varying the magnitude of the control of said alternating voltage upon said device keeping the phase of said control voltage constant.

11. In an electric control system, the combination of a source of alternating current, a vapor electric device having a cathode an anode and a control electrode, a work circuit including said source and the space current path of said device, a transformer connected to said source, a secondary winding on said transformer, a resistance path connected between said cathode and the terminal of said secondary winding of opposite phase with respect to said anode, a connection from said control electrode to a variable tap on said resistance path, the other terminal of said secondary winding being effectively connected to said cathode through a connection having substantially entirely capacity reactance.

12. In an electric control system, the combination of a source of alternating current, a vapor electric device having a cathode an anode and a control electrode, a work circuit including said source and the space current path of said device, a transformer connected to said source, a secondary winding on said transformer, a resistance path connected between said cathode and the terminal of said secondary winding of opposite phase with respect to said anode, a connection from said control electrode to a variable tap on said resistance path, the other terminal of said secondary winding being connected to said cathode through a condenser.

13. In an electric control system, the combination of a source of alternating current, a vapor electric device having a cathode an anode and a control electrode, a work circuit including said source and the space current path of said device, a transformer connected to said source, a secondary winding on said transformer, a resistance path connected between said cathode and the terminal of said secondary winding of opposite phase with respect to said anode, a connection from said control electrode to a variable tap on said resistance path, the other terminal of said secondary winding being connected to said cathode through a condenser having a capacity reactance at the frequency of said source of the same order of magnitude as the resistance of said resistance path.

14. In an electric control system, the combination of a source of alternating current, a vapor electric device having a cathode an anode and a control electrode, a work circuit including said source and the space current path of said device, a transformer connected to said source, a secondary winding on said transformer, a resistance element connected between said cathode and the terminal of said secondary winding of opposite phase with respect to said anode, the other terminal of said winding being connected to said cathode through a capacity reactance connection, and a connection from said control electrode to said cathode, said connection including a variable condenser and at least a portion of said resistance element.

15. In an electric control system, the combination of a source of alternating current, a vapor electric device having a cathode an anode and a control electrode, a work circuit including said source and the space current path of said device, a transformer connected to said source, a secondary winding on said transformer, a resistance path connected between said cathode and the terminal of said secondary winding of opposite phase with respect to said anode, the other terminal of said winding being connected to said cathode through a capacity reactance connection, and a variable condenser connected between said control electrode and a point on said resistance path.

16. In an electric control system, the combination of a source of alternating current, a vapor electric device having a cathode an anode and a control electrode, a work circuit including said source and the space current path of said device, a transformer connected to said source, a secondary winding on said transformer, a resistance path connected between said cathode and the terminal of said secondary winding of opposite phase with respect to said anode, the other terminal of said winding being connected to said cathode through a condenser, and a variable condenser connected between said control electrode and a point on said resistance path.

17. In an electric control system, the combination of a source of alternating current, a vapor electric device having a cathode an anode and a control electrode, a work circuit including said source and the space current path of said device, a transformer connected to said source, a secondary winding on said transformer, a circuit connected across said secondary winding including a resistance element and a capacity element connected in series relation, a circuit for impressing upon said control electrode a voltage derived from across at least a portion of said resistance element, and means for varying the amplitude of the voltage applied to said control electrode comprising a variable condenser connected in series with said control electrode.

18. An electric control system comprising a vapor electric device having a cathode an anode and a control electrode, an alternating current circuit including the space current path of said device, means for varying the potential of said control electrode with respect to said cathode in accordance with a symmetrical alternating voltage having a lagging phase displacement with respect to the voltage of said anode greater than 90 degrees and substantially less than 180 degrees, and means for varying the amplitude of said alternating control voltage.

19. An electric control system comprising a vapor electric device having a cathode an anode and a control electrode, a source of alternating current, a circuit connected to said source including the space current path of said device, means for varying the potential of said control electrode with respect to said cathode in accordance with a symmetrical alternating voltage having a lagging phase displacement with respect to said anode voltage of the order of 135 degrees, and means for varying the amplitude of said alternating control voltage.

20. An electric system for variably controlling the current supplied to a load comprising, in combination, a vapor electric device having a cathode an anode and a control electrode, a source of alternating current, a circuit connected to said source including the space current path of said device and an independent load device, a second circuit connected to said source for varying the potential of said control electrode with respect to said cathode in accordance with a symmetrical alternating voltage having a lagging phase displacement with respect to the anode voltage of the order of 135 degrees, said second circuit including a variable impedance element for varying the amplitude of said alternating control voltage to progressively vary the time of starting of the arc in said vapor electric device.

21. An electric control system comprising a source of alternating current, a separate load device, a circuit for supplying current to said load device from said source, a vapor electric device having a cathode an anode and a control electrode, the space current path of said device being included in series with said load circuit, means for impressing upon said control electrode an alternating voltage of fixed phase lagging the anode voltage by an angle less than 180 degrees, and means for varying the amplitude of said alternating control voltage to progressively shift the point of starting of the arc in said discharge device substantially throughout the positive pulsation of said anode voltage.

22. An electric control system comprising a source of alternating current, a separate load device, a circuit for supplying current to said load device from said source, a vapor electric device having a cathode an anode and a control electrode, the space current path of said device being included in series with said load circuit, means for impressing upon said control electrode an alternating voltage having a lagging phase displacement with respect to the voltage of the anode greater than 90 degrees and substantially less than 180 degrees, means for varying the amplitude of said alternating control voltage to progressively shift the point of starting of the arc in said discharge device throughout the major portion of the positive pulsation of said anode voltage.

23. An electric control system comprising a source of alternating current, a separate load device, a circuit for supplying current to said load device from said source, a vapor electric device having a cathode an anode and a control electrode, the space current path of said device being included in series with said load circuit, means for impressing upon said control electrode an alternating voltage having a lagging phase displacement with respect to said anode voltage of the order of 135 degrees, and means for varying the amplitude of said alternating control voltage to progressively shift the point of starting of the arc in said discharge device throughout the major portion of the positive pulsation of said anode voltage.

24. An electric control system comprising, in combination, an electric discharge device having an ionizable atmosphere, a continuously energized cathode, an anode, and a control electrode insulated from the space discharge path, an alternating current circuit including the space current path of said device, means for impressing upon said control electrode an alternating voltage having a lagging phase displacement greater than 90 degrees and substantially less than 180 degrees with respect to the anode-cathode voltage of said device, and means for varying the amplitude of said alternating control voltage.

25. An electric control system comprising, in combination, an electric discharge device having an insulating envelope cotaining a mercury vapor atmosphere, a continuously energized cathode, and an anode, a control electrode arranged external of said insulating envelope, an alternating current circuit including the space current path of said device, means for impressing upon said control electrode an alternating voltage having a lagging phase displacement greater than 90 degrees and substantially less than 180 degrees with respect to the anode-cathode voltage, and means for varying the amplitude of said control voltage.

26. An electric control system comprising, in combination, an electric discharge device having an ionizable atmosphere, a continuously energized cathode, an anode, and a control electrode insulated from the space discharge path, a source of alternating current, a circuit connected to said source including the space current path of said device, means for deriving from said source a symmetrical alternating current voltage having a lagging phase displacement of the order of 135 degrees with respect to the anode-cathode voltage, means for varying the potential of said control electrode with respect to one of the remaining electrodes of said device in accordance with said symmetrical alternating voltage, and means for varying the amplitude of said alternating control voltage.

27. An electric control system comprising, in combination, an electric discharge device having an insulating envelope containing a mercury vapor atmosphere, a continuously energized cathode, and an anode, a control electrode arranged external of said insulating envelope, a source of alternating current, a circuit connected to said source including the space current path of said device, means for deriving from said source a symmetrical alternating current voltage having a lagging phase displacement of the order to 135 degrees with respect to the anode-cathode voltage, means for varying the potential of said control electrode with respect to said cathode in accordance with said symmetrical alternating voltage, and means for varying the amplitude of said alternating control voltage.

PALMER H. CRAIG.